(12) United States Patent  
Ranganath et al.

(10) Patent No.: US 12,505,714 B2  
(45) Date of Patent: Dec. 23, 2025

(54) INFORMATION PROCESSING APPARATUS, INFORMATION PROCESSING METHOD, AND STORAGE MEDIUM

(71) Applicant: NEC Corporation, Tokyo (JP)

(72) Inventors: Kris Ranganath, Sacramento, CA (US); Rody Bagtes, Sacramento, CA (US); Kannan Veeranan Gandhi, Sacramento, CA (US); Arun Chandrasekaran, Sacramento, CA (US)

(73) Assignee: NEC CORPORATION, Tokyo (JP)

( * ) Notice: Subject to any disclaimer, the term of this patent is extended or adjusted under 35 U.S.C. 154(b) by 401 days.

(21) Appl. No.: 18/019,303

(22) PCT Filed: Aug. 13, 2021

(86) PCT No.: PCT/JP2021/029797  
§ 371 (c)(1),  
(2) Date: Feb. 2, 2023

(87) PCT Pub. No.: WO2022/034921  
PCT Pub. Date: Feb. 17, 2022

(65) Prior Publication Data  
US 2023/0274597 A1  Aug. 31, 2023

Related U.S. Application Data

(60) Provisional application No. 63/065,868, filed on Aug. 14, 2020.

(51) Int. Cl.  
*G07C 9/37*  (2020.01)  
*G06V 20/52*  (2022.01)  
(Continued)

(52) U.S. Cl.  
CPC .............. *G07C 9/37* (2020.01); *G06V 20/52* (2022.01); *G06V 40/172* (2022.01); *G07C 9/10* (2020.01)

(58) Field of Classification Search  
None  
See application file for complete search history.

(56) References Cited

U.S. PATENT DOCUMENTS 12,087,118 B2 * 9/2024 Inoue ..................... G07C 9/27  
2021/0117655 A1 * 4/2021 Kochi .................. G06V 40/172

FOREIGN PATENT DOCUMENTS

JP 2018195345 A * 12/2018  
JP 2019133364 A * 8/2019 .......... G06K 9/00221

OTHER PUBLICATIONS

International Search Report for PCT Application No. PCT/JP2021/029797, mailed on Sep. 21, 2021.  
(Continued)

*Primary Examiner* — Delomia L Gilliard  
(74) *Attorney, Agent, or Firm* — Sughrue Mion, PLLC

(57) ABSTRACT

An apparatus obtains a first image including a plurality of body regions captured at a first time by one or more cameras, each of the plurality of body regions corresponding to a person, among a plurality of persons; detects a first person, among the plurality of persons, by performing facial recognition operation on one of the plurality of body regions in the image obtained from the camera; determines, based on a size of a first body region corresponding to the first person captured in a second image, that the first body region approaching the barrier corresponds to a person closest to the barrier among the plurality of persons; and outputs information to control the barrier to open based on the determination that the first body region corresponds to the person closest to the barrier among the plurality of persons.

14 Claims, 7 Drawing Sheets

(51) Int. Cl.
*G06V 40/16* (2022.01)
*G07C 9/10* (2020.01)

(56) References Cited

OTHER PUBLICATIONS

Written opinion for PCT Application No. PCT/JP2021/029797, mailed on Sep. 21, 2021.

\* cited by examiner

INFORMATION PROCESSING APPARATUS, INFORMATION PROCESSING METHOD, AND STORAGE MEDIUM

TECHNICAL FIELD

The disclosure relates to an information processing apparatus, an information processing method, and a storage medium. More particularly, it relates to an information processing apparatus, an information processing method, and a storage medium for performing authentication of people using an image captured by a camera.

RELATED ART

Recently, a gate apparatus has been provided in facilities, such as airports, for controlling a passageway through which a user may walk, such as a security screening area. In the related art gate apparatus, a face authentication operation may be performed by comparing a face image acquired from a camera with a face image acquired from a registered image, such as a passport.

SUMMARY

According to one or more aspects of the disclosure, there is provided a gate apparatus, a control method of the gate apparatus, and a storage medium for allowing a user, such as passenger or a visitor, to pass through a barrier or a gate.

According to an aspect of the disclosure, there is provided an apparatus including: a memory storing one or more instructions; and a processor configured to execute the one or more instructions to: obtain a first image including a plurality of body regions captured at a first time by one or more cameras, each of the plurality of body regions corresponding to a person, among a plurality of persons; detect a first person, among the plurality of persons, by performing facial recognition operation on one of the plurality of body regions in the image obtained from the camera; determine, based on a size of a first body region corresponding to the first person captured in a second image, that the first body region approaching the barrier corresponds to a person closest to the barrier among the plurality of persons; and output information to control the barrier to open based on the determination that the first body region corresponds to the person closest to the barrier among the plurality of persons.

Each of the plurality of body regions may include a face region and a torso region.

The first body region in the second image may include a torso region.

The processor may be further configured to track the first body region in the second image captured by the one or more cameras at a second time subsequent to the first time.

The processor may be further configured to determine that the first body region approaching the barrier corresponds to the person closest to the barrier by: comparing the size of the first body region with sizes of each of the other body regions, among the plurality of body regions; and determining the first body region having the largest size as the closest body region to the one or more cameras.

According to another aspect of the disclosure, there is provided an apparatus including: a memory storing one or more instructions; and a processor configured to execute the one or more instructions to: obtain an image captured by a camera, the image including a plurality of body regions corresponding respectively to a plurality of persons approaching a barrier; detect a first person as a person closest to the camera, among the plurality of persons, based on a size of a first body region corresponding to the first person; and output information to control the barrier based on a result of a face recognition operation comparing information on a feature region corresponding to the first body region of the first person with a plurality of registered information, each of the plurality of registered identification information corresponding to a person registered prior to obtaining the image.

The body region may comprise a face region and a torso region, and the feature region may be the face region.

The processor may be further configured to determine that the first body region approaching the barrier corresponds to the person closest to the barrier by: comparing the size of the first body region with sizes of each of the other body regions, among the plurality of body regions; and determining the first body region having the largest size as the closest body region to the barrier.

The processor may be further configured to detect the person closest to the camera based on the body size before the face recognition operation.

According to another aspect of the disclosure, there is provided an apparatus including: a memory storing one or more instructions; and a processor configured to execute the one or more instructions to: obtain a first image including a plurality of body regions captured at a first time by one or more cameras, each of the plurality of body regions corresponding to a person, among a plurality of persons; detect a first person, among the plurality of persons, by performing facial recognition operation on one of the plurality of body regions in the image obtained from the camera; generate a first boundary corresponding a first body region of the first person; determine, based on the first boundary being unobstructed by a second boundary corresponding a second body region, that the first body region approaching the barrier corresponds to a person closest to the barrier among the plurality of persons; and output information to control the barrier to open based on the determination that the first body region corresponds to the person closest to the barrier among the plurality of persons.

Each of the plurality of body regions may include a face region and a torso region.

The first boundary may be a contiguous bounding box surrounding the first body region.

The first boundary may be unobstructed when one or more second boundaries corresponding to one or more second persons do not overlap the first boundary.

The first boundary may be unobstructed when the respective second body regions within the one or more second boundaries do not overlap the first boundary.

The first boundary may be unobstructed when the respective the one or more second boundaries do not overlap the first body region within the first boundary.

According to another aspect of the disclosure, there is provided an apparatus including: a memory storing one or more instructions; and a processor configured to execute the one or more instructions to: obtain an image captured by a camera, the image including a first body region corresponding to a first person and a second body region corresponding to a second person; generate a first boundary corresponding the first body region of the first person; generate a second boundary corresponding the second body region; identify that a first person is closest to the camera based on a determination that the first boundary corresponding the first body region is unobstructed by the second boundary corresponding the second body region; and output information to control the barrier based on a result of a face recognition operation comparing information on the first body region of the first with a plurality of registered information, each of the plurality of registered identification information corresponding to a person registered prior to obtaining the image.

The processor may be further configured to detect the person closest to the camera based on the boundary before the face recognition operation.

According to another aspect of the disclosure, there is provided a method including: obtaining a first image including a plurality of body regions captured at a first time by one or more cameras, each of the plurality of body regions corresponding to a person, among a plurality of persons; detecting a first person, among the plurality of persons, by performing facial recognition operation on one of the plurality of body regions in the image obtained from the camera; determining, based on a size of a first body region corresponding to the first person captured in a second image, that the first body region approaching the barrier corresponds to a person closest to the barrier among the plurality of persons; and outputting information to control the barrier to open based on the determination that the first body region corresponds to the person closest to the barrier among the plurality of persons.

According to another aspect of the disclosure, there is provided a method including: obtaining an image captured by a camera, the image including a plurality of body regions corresponding respectively to a plurality of persons approaching a barrier; detecting a first person as a person closest to the camera, among the plurality of persons, based on a size of a first body region corresponding to the first person; and outputting information to control the barrier based on a result of a face recognition operation, the face recognition operation including comparing information on a feature region corresponding to the first body region of the first person with a plurality of registered information, each of the plurality of registered identification information corresponding to a person registered prior to obtaining the image.

According to another aspect of the disclosure, there is provided a method including: obtaining a first image including a plurality of body regions captured at a first time by one or more cameras, each of the plurality of body regions corresponding to a person, among a plurality of persons; detecting a first person, among the plurality of persons, by performing facial recognition operation on one of the plurality of body regions in the image obtained from the camera; generating a first boundary corresponding a first body region of the first person; determining, based on the first boundary being unobstructed by a second boundary corresponding a second body region, that the first body region approaching the barrier corresponds to a person closest to the barrier among the plurality of persons; and outputting information to control the barrier to open based on the determination that the first body region corresponds to the person closest to the barrier among the plurality of persons.

According to another aspect of the disclosure, there is provided a method including: obtaining an image captured by a camera, the image including a first body region corresponding to a first person and a second body region corresponding to a second person; generating a first boundary corresponding the first body region of the first person; generating a second boundary corresponding the second body region; identifying that a first person is closest to the camera based on a determination that the first boundary corresponding the first body region is unobstructed by the second boundary corresponding the second body region; and outputting information to control the barrier based on a result of a face recognition operation, the face recognition operation including comparing information on the first body region of the first with a plurality of registered information, each of the plurality of registered identification information corresponding to a person registered prior to obtaining the image.

DESCRIPTION OF EXAMPLE EMBODIMENTS

Figure 1A:
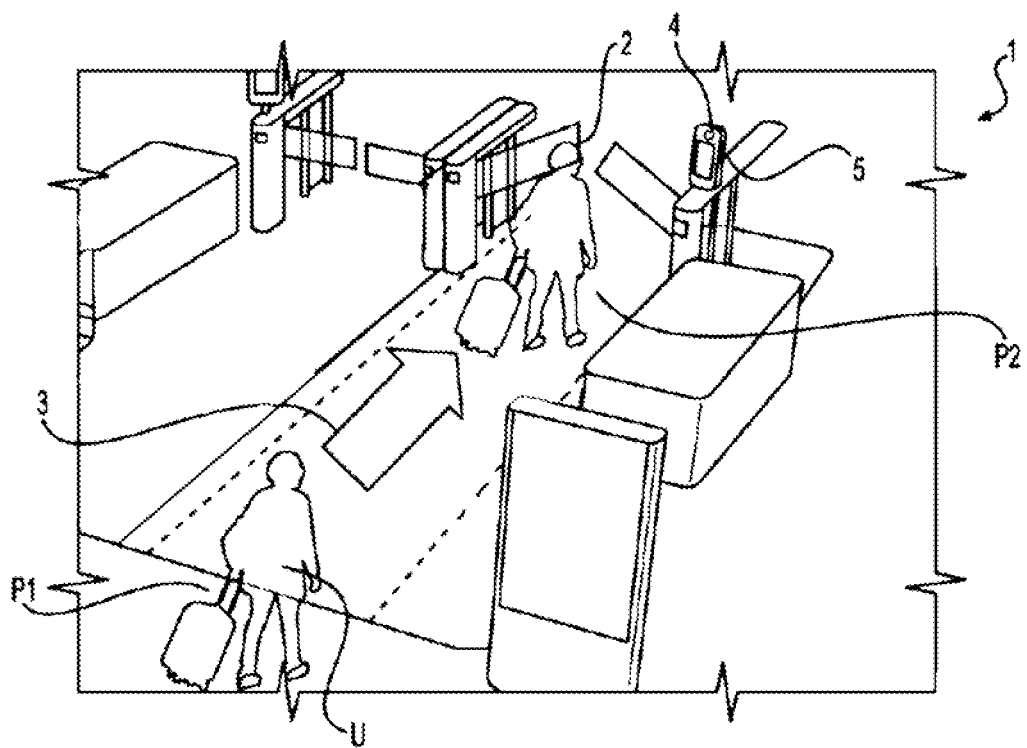
FIG. 1A illustrates an example of a gate apparatus according to an embodiment.

Example embodiments will now be described below in more detail with reference to the accompanying drawings. The following detailed descriptions are provided to assist the reader in gaining a comprehensive understanding of the methods, apparatuses, and/or systems described herein. However, the example embodiment provided in the disclosure should not be considered as limiting the scope of the disclosure. Accordingly, various changes, modifications, and equivalents of the systems, apparatuses and/or methods described herein will be suggested to those of ordinary skill in the art.

The terms used in the description are intended to describe embodiments only, and shall by no means be restrictive. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

One or more example embodiments of the disclosure will be described below with reference to the drawings. Throughout the drawings, the same components or corresponding components are labeled with the same reference numerals, and, accordingly, the description thereof may be omitted or simplified.

Figure 1B:
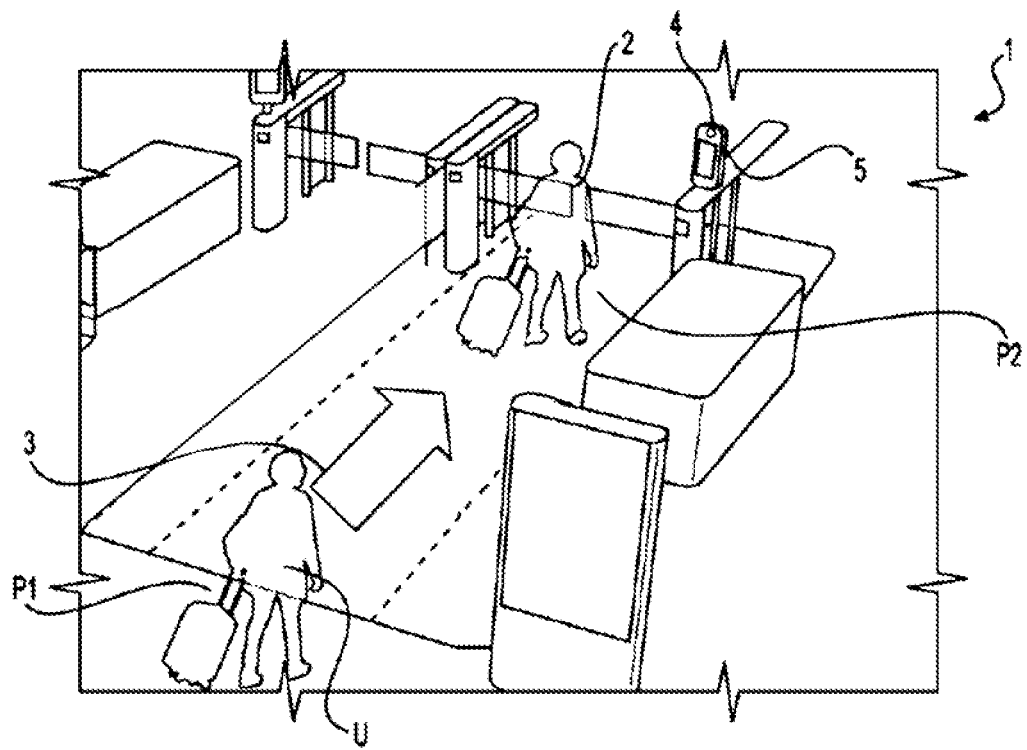
FIG. 1B illustrates an example of a gate apparatus according to an embodiment.

FIGS. 1A and 1B illustrate an example of a gate apparatus 1 according to a non-limiting example embodiment. As illustrated in FIG. 1A, the gate apparatus 1 may include a gate 2 provided in a passage way 3 for controlling traffic through the passage way 3. According to an example embodiment, the gate apparatus 1 may be a barrier apparatus having a barrier provided in a passage way 3 for controlling traffic through the passage way 3. The gate apparatus 1 may further include a camera 4 and an information processing apparatus 5 for performing facial recognition on users walking through the passage way 3. According to other example embodiments, the information processing apparatus 5 may be referred to as an information processing device, an information processing system, an information processing terminal, etc.

According to an embodiment, the information processing apparatus 5 may obtain a first image of a person, or a user (U), at a first position P1, while the person approaches the gate 2. The first image may be captured at a first time (t1) by the camera 4. The first image may include one or more faces of people near the gate apparatus, each of the one or more faces corresponding to a user, among a plurality of users.

According to an embodiment, the information processing apparatus 5 may be configured to detect a first user, among a plurality of users, by performing a facial recognition operation on the faces in the first image. For instance, the facial recognition operation may be part of an authentication operation performed in whole or in part by the information processing apparatus 5, which is configured to authenticate the face of the user as a person authorized to pass through the gate, referred to as an authenticated user (U).

Figure 4:
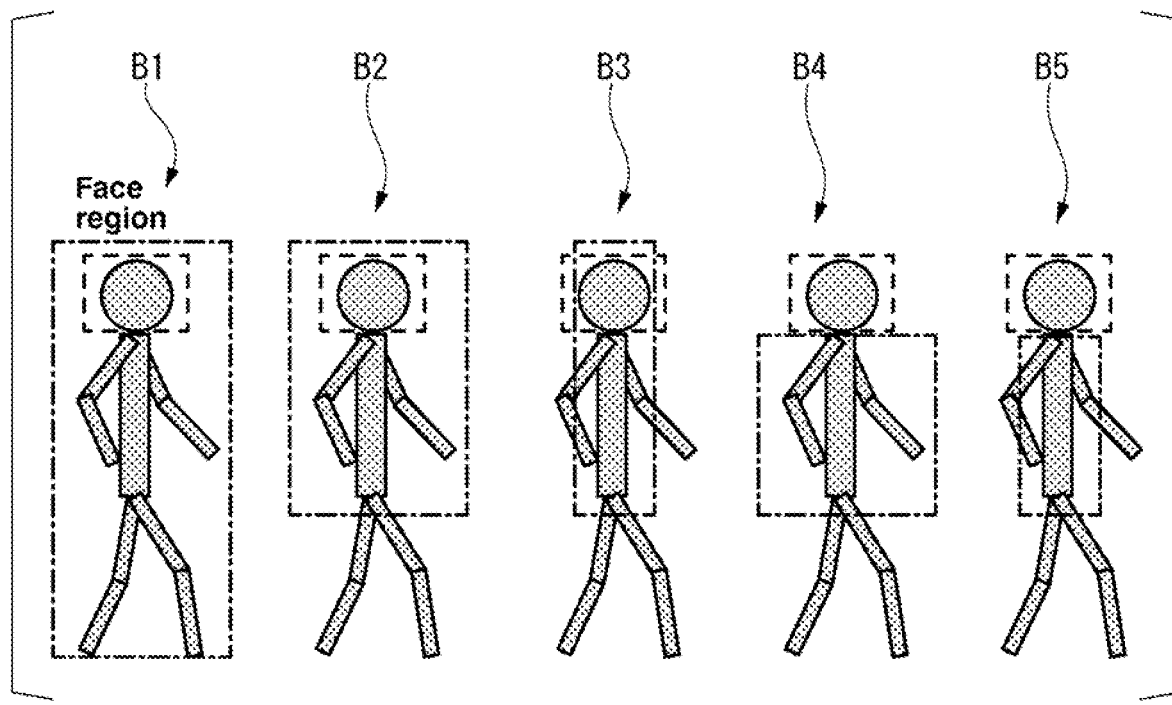
FIG. 4 illustrates examples of body regions according to some embodiments.

According to an embodiment, the information processing apparatus 5 may detect a region of the authenticated user (U), as a body region, in the first image. According to various embodiments, the body region may correspond to different regions or combination of the different regions of the subject as illustrated in FIG. 4. For instance, according to an embodiment, the body region may be the entire (whole) body of the subject (see reference symbol B1). According to other embodiments, the body region may be of one of a combination of the upper body portion and the head portion of the subject (see reference symbol B2), a combination the head portion and the torso portion of the subject (see reference symbol B3), a combination the torso portion and the arm portion of the subject (see reference symbol B4) or only the torso portion of the subject (see reference symbol B5).

According to an embodiment, the body region can be associated with the face region of the authenticated user (U). By associating the authenticated user's (U) body region with the corresponding face region, the authenticated user (U) can be tracked by tracking the body region. When the user is at a second position P2 in the passage way, a second image can be acquired by the camera 4. The second image may be captured at a second time (t2) subsequent to the first time (t1), and may be captured by the same camera 4 or by an image capturing device that is different from camera 4. The second image may contain the body region, but may not contain the face region of the authenticated user (U). This might be because of the authenticated user's (U) movement between time t1 and time t2, or it might be because the authenticated user's (U) face is not sufficiently facing the camera 4 at time t2, the face is obscured in the second image, or is not present in the second image at time t2. Since the body region is associated with the authenticated user (U), the authenticated user (U) can be tracked in the second image even though the face region might not be present in the second image. The information processing apparatus 5 may output information to control the gate 2 to be opened based on a determination the tracked body region is approaching the gate. In this manner, it is not necessary for the information processing apparatus 5 to repeatedly authenticate the user after the user has been authenticated as an authorized person. For instance, since the body region of the authenticated user is being tracked, the gate 2 may be opened even when the person in not facing the camera 4 at position P2.

In FIG. 1B, the information processing apparatus 5 can be configured to prevent the gate 2 from opening when the information processing apparatus 5 determines that the body region tracked in the second image at position P2 is not associated with a face region of a user authenticated in the first image. For instance, when the information processing apparatus 5 is unable to perform facial recognition operation on a face in the first image obtained from the camera 4, the information processing apparatus 5 may not track the body region corresponding to the face in the first image. Therefore, the information processing apparatus 5 does not open the gate 2 unless an additional facial recognition operation for the user is performed and the user authenticated.

Figure 1C:
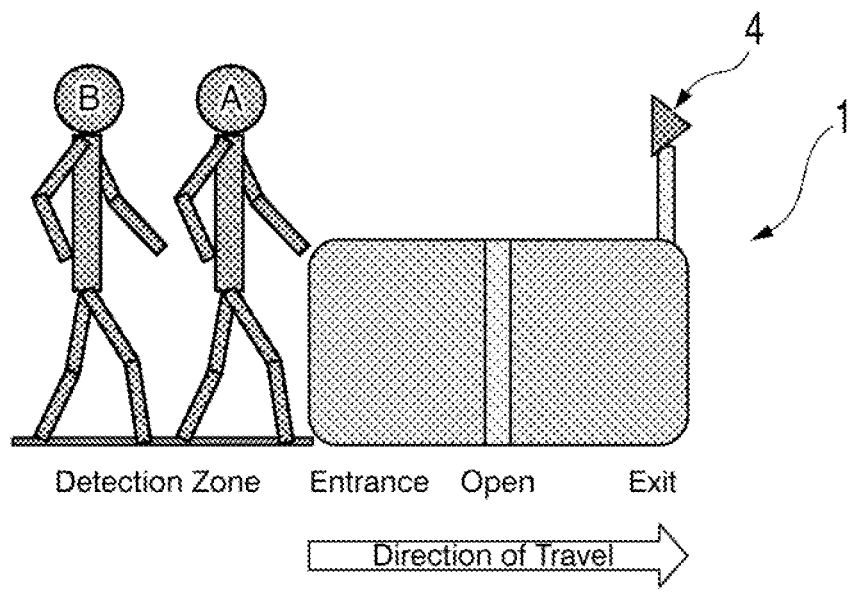
FIG. 1C illustrates an example scenario in which multiple persons approach the gate apparatus according to an embodiment.
Figure 1D:
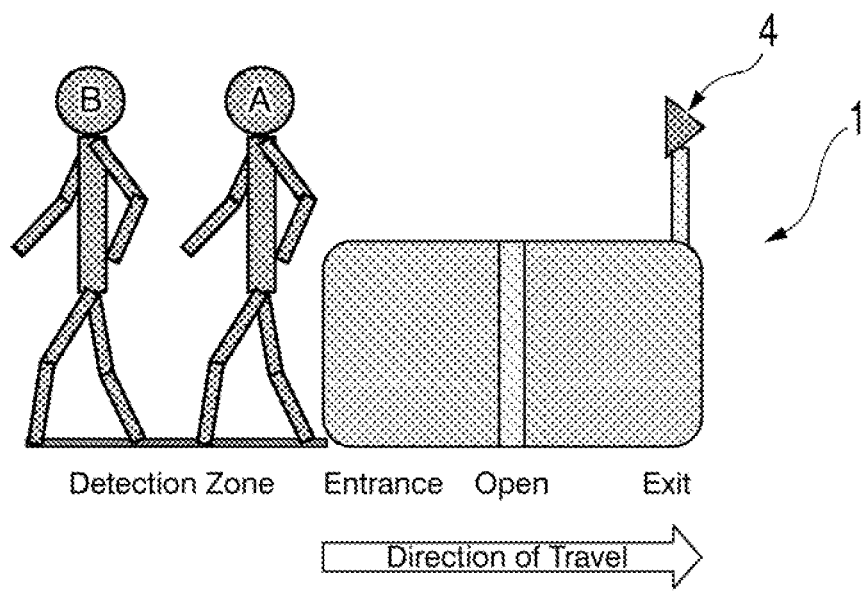
FIG. 1D illustrates an example scenario in which multiple persons approach the gate apparatus according to an embodiment.

FIGS. 1C and 1D illustrate scenarios in which multiple persons approach the gate apparatus according to an embodiment.

Referring to FIG. 1C, when a camera 4 captures multiple persons approaching the gate apparatus 1 in an image, a front person is identified by the gate apparatus 1 to determine if the front person is an authenticated person for the barrier to be opened or closed. According to an embodiment, the front person may be a person closest to the gate apparatus 1 or a person closest to the camera 4.

According to an embodiment, one or more of the multiple persons may be authenticated prior to the determination of the front person and may be tracked. According to another embodiment, a front person may be authenticated after the determination of the front person in a case where the front person was not previously authenticated and tracked.

According to an embodiment, the front person may be detected based on an eye distance of each of the multiple persons at the gate apparatus 1. The eye distance may be a number of pixels between a person's eyes. The gate apparatus 1 may determine which face is closest to the camera based on the size of the eye distance, i.e., the larger the eye distance, the closer the face.

Referring to FIG. 1C, when two persons A and B facing the camera approach the gate apparatus 1, the gate apparatus 1 may determine that the eye distance for A is 100 and the eye distance for B is 85. As such, the gate apparatus 1 determines that person A is closer.

Although two persons are shown in FIG. 1C, the number of persons captured by the camera is not limited thereto according to the disclosure. Moreover, although one camera is shown in FIG. 1C, the number of cameras is not limited thereto according to the disclosure. For instance, multiple cameras may be provided to capture one or more images. According to another embodiment, multiple cameras may operate in coordination with each other to generate an image or images used to perform face recognition or identify the closest person.

However, there may arise scenarios in which the gate apparatus may not be able to calculate the eye distance, and therefore the gate apparatus may be unable to accurately identify a front person. For instance, if a person's face is covered (i.e., eyes not clearly visible by the camera) or if persons A and B enter the gate walking backwards as shown in FIG. 1D, the gate apparatus 1 will be unable to calculate eye distance. As such, the gate apparatus 1 may incorrectly determine person B as the front person.

In order to improve accuracy in detecting the front person, the gate apparatus 1 may determine the front person based on features other than the eye distance of each of the multiple persons approaching the gate apparatus 1. According to an embodiment, the gate apparatus 1 may determine the front person based on a size of the body region of each of the persons approaching the gate apparatus 1 as described below in detail with reference to FIGS. 3 through 5. According to another embodiment, the gate apparatus 1 may determine the front person based on a boundary or an outline corresponding to the body region of each of the persons approaching the gate apparatus 1 as described below in detail with reference to FIGS. 6 and 7.

Figure 2:
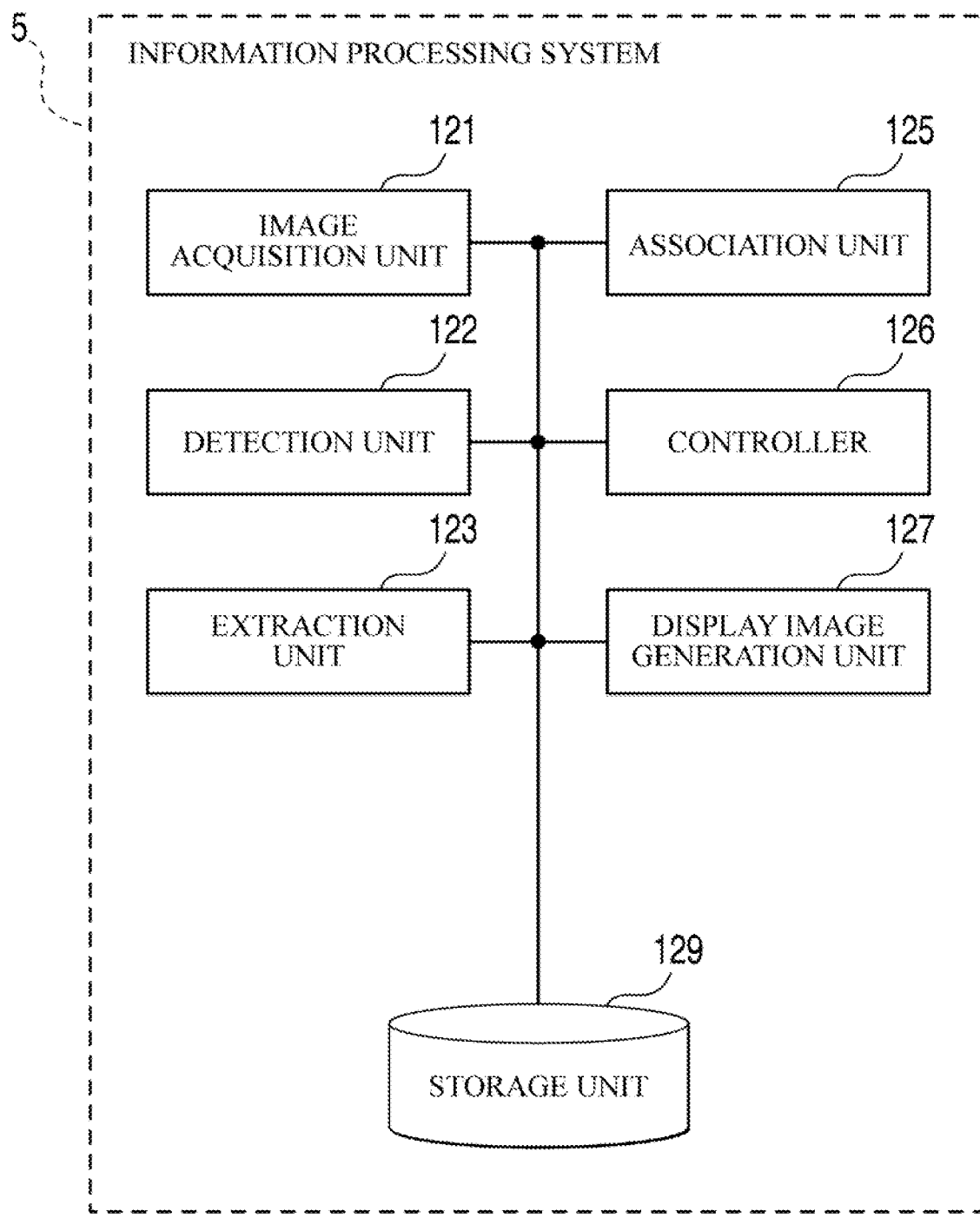
FIG. 2 is a block diagram of an information processing apparatus according to the embodiment.

FIG. 2 is a block diagram of an information processing apparatus 5 according to an example embodiment. The information processing apparatus 5 may be part of the gate apparatus 1. According to an embodiment, the information processing apparatus 5 may include one or more processors (such a CPU 102 in FIG. 8 or other processors) and a memory (such as RAM 104 in FIG. 8 or other memories). The information processing apparatus 5 may have an image acquisition unit 121, a detection unit 122, an extraction unit 123, an association unit 125, a controller 126, a display image generation unit 127 and a storage unit 129. According to an embodiment, the CPU 102 may execute one or more instructions stored in the memory to implement the various units. The units and the operations performed by the units are provided for illustration, but the disclosure is not limited to the units or the operations performed by the units. According to other embodiments, the novel features of the disclosure may be performed by various combinations of units, including units described above and other units.

Figure 8:
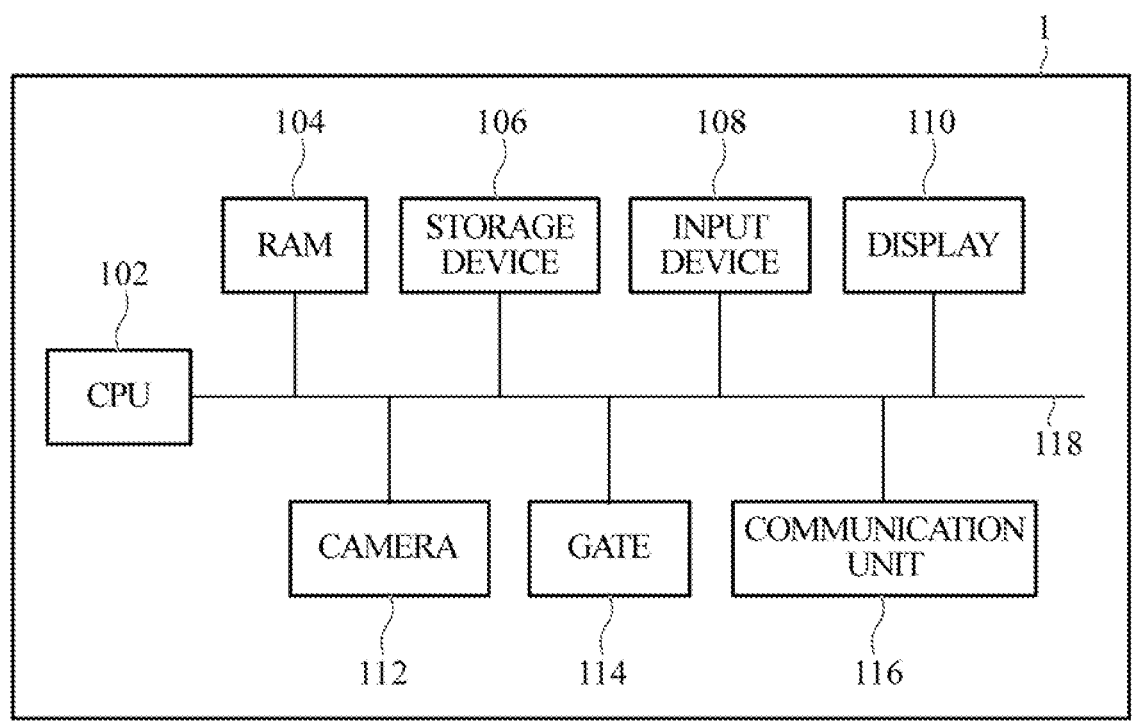
FIG. 8 is a block diagram illustrating an example of a hardware configuration of a gate control apparatus 1 according to an example embodiment.

According to an embodiment, the image acquisition unit 121 may obtain an image from a camera 4, the detection unit 122 may detect a person or a plurality of persons in the image obtained from camera 4, the extraction unit 123 may extract a feature, such as a facial feature and a body feature, in the image, the association unit 125 may associate the extracted facial feature and the body feature with each other, a controller 126 may control a gate 2 to be opened or closed, the display image generation unit 127 may generate information to be displayed on a display 110 (as shown in FIG. 8) and the storage unit 129 may store information.

Figure 3A:
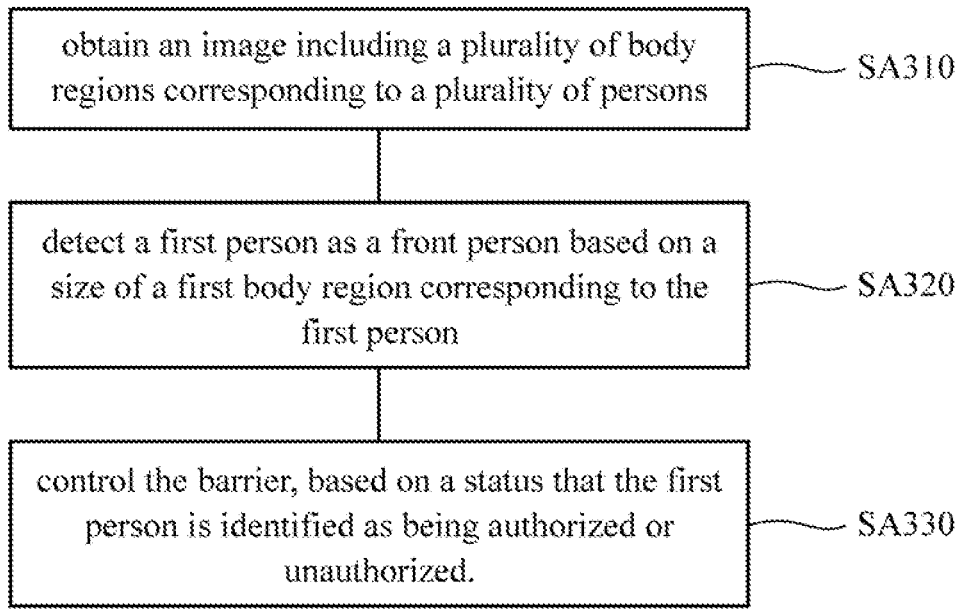
FIG. 3A is a flowchart illustrating an outline of a process performed by the information processing apparatus according to the embodiment.

FIG. 3A is a flowchart illustrating an overview of the process performed by the information processing apparatus 5 according to an example embodiment. With reference to FIGS. 1A, 1B and 2, the overview of the process performed by the information processing apparatus 5 will be described along the flowchart of FIG. 3A.

In SA310 of FIG. 3A, the information processing apparatus 5 may obtain an image from a camera 4 (as shown in FIGS. 1A and 1B). According to an embodiment, the method of obtaining the image may include the following operations performed by the image acquisition unit 121. For instance, the image acquisition unit 121 may obtain the image from the camera 4. The obtained first image may include a plurality of body regions, each of the body regions corresponding to a subject, among a plurality of subjects approaching the gate apparatus to be recognized. According to an embodiment, the subject to be recognized may be a person.

In SA320 of FIG. 3A, the information processing apparatus 5 may identify a front person in the image. The front person may be a person, among a plurality of persons, who is closest to the image capturing device or the gate apparatus. This process may correspond to the illustration in FIG. 5.

According to an embodiment, the method of identifying the front person may include the following operations performed by the detection unit 122 and the extraction unit 123. For instance, the extraction unit 123 may extract a plurality of body regions, each corresponding to one of the plurality of person in the image obtained by the image acquisition unit 121. According to an embodiment, the detection unit 122 may obtain the plurality of body regions extracted by the extraction unit 123 and may identify the front person by comparing a size corresponding to each of the plurality of body regions. For instance, the detection unit 122 may compare an area covered by each of the plurality of body regions and determine a body region, among the plurality of body regions, having the largest area as the body region closest to the camera. As such, the person associated with the closest body region is identified as a front person.

Referring to FIG. 4, the body region may be the entire (whole) body of the subject according to an embodiment. According to other embodiments, the body region may be one of a combination of the upper body portion and the head portion of the subject, a combination the head portion and the torso portion of the subject, a combination the torso portion and the arm portion of the subject or only the torso portion of the subject.

In SA330, the information processing apparatus 5 may control the barrier, based on a status that the first person is identified as being authorized or unauthorized. According to an embodiment, the authorization status of the person is determined after the detection of the first person as the front person. In this case, the image processing apparatus 5 may perform facial recognition on the front person by comparing information of a face feature of the front person with a plurality of registered information. According to an embodiment, the method of performing facial recognition may include the following operations performed by the detection unit 122. For instance, the detection unit 122 may obtain the facial feature of the front person extracted by the extraction unit 123 and detect whether the facial feature matches a registered facial feature, among a plurality of registered facial features. Each of the plurality of registered facial features may correspond to a face of a person, among a plurality of persons previously registered. The registered facial features may be stored in a storage device 106.

Accordingly, the information processing apparatus 5 may output information to control a barrier of the gate apparatus based on a result of the facial recognition performed after the detection of the front person. This process may correspond to the illustration in FIGS. 1A and 1B.

According to another embodiment, the authorization status of the person is determined prior to the detection of the first person as the front person. In this case, one or more of the plurality of persons may be authenticated prior to the determination of the front person and may be tracked by the information processing apparatus 5.

According to an embodiment, the method of performing body tracking may include the following operations performed by the image acquisition unit 121, the detection unit 122, the extraction unit 123 and the association unit 125. For instance, the extraction unit 123 may extract a body region of a subject in a first image. The operation of extracting the body region may be performed after the detection unit detects a match between the face feature in the first image with a registered face feature. According to another embodiment, the operation of extracting the body region may be performed before the detection unit detects a match between the face feature in the first image with a registered face feature or simultaneously while the detection unit detects a match between the face feature in the first image with a registered face feature.

According to an embodiment, the association unit 125 associates the extracted body region with the face region in the first image. For instance, the association unit 125 determines that the body region corresponds to the face region by analyzing one or more characteristics of the face region and the body region. For instance, when the association unit 125 determines that one or more characteristics of the face region is similar to one or more characteristics of the body region, the association unit 125 may associate the face region with the body region. According to another embodiment, the association unit 125 may determine that the body region corresponds to the face region based on a proximity of the face region to the body region.

According to an embodiment, the association unit may store the associated face region and body region in a storage. For instance, the storage may store the face region and the body region in association with identification information of the detected person. The associated face region and body region may be temporarily stored in the storage.

According to an embodiment, the image acquisition unit 121 may obtain a second image captured by the camera 4 at a second time. The second time being different from the first time. According to an embodiment, this second image may be the image mentioned in SA310 of FIG. 3A. According to an embodiment, the second time is after the first time. According to an embodiment, the second image may be captured by an image acquisition device, such as a camera, that is different from the camera capturing the first image.

According to an embodiment, the extraction unit 123 may extract a feature of the body region in the second image, and the detection unit 122 may obtain the feature of the body region in the second image from the extraction unit 123 and detect whether the feature of the body region in the second image matches a feature of body region stored in the storage unit 129. Accordingly, when there is a match between the body region in the second image and the body region obtained from the storage unit 129, the detection unit 122 may obtain the identification of the subject previously detected in the first image. Accordingly, the information processing apparatus 5 may track the subject using the body regions extracted in the first image and the second image.

Accordingly, the information processing apparatus 5 may output information to control a barrier of the gate apparatus based on a result of the facial recognition performed prior to the detection of the front person. This process may correspond to the illustration in FIGS. 1A and 1B.

Figure 3B:
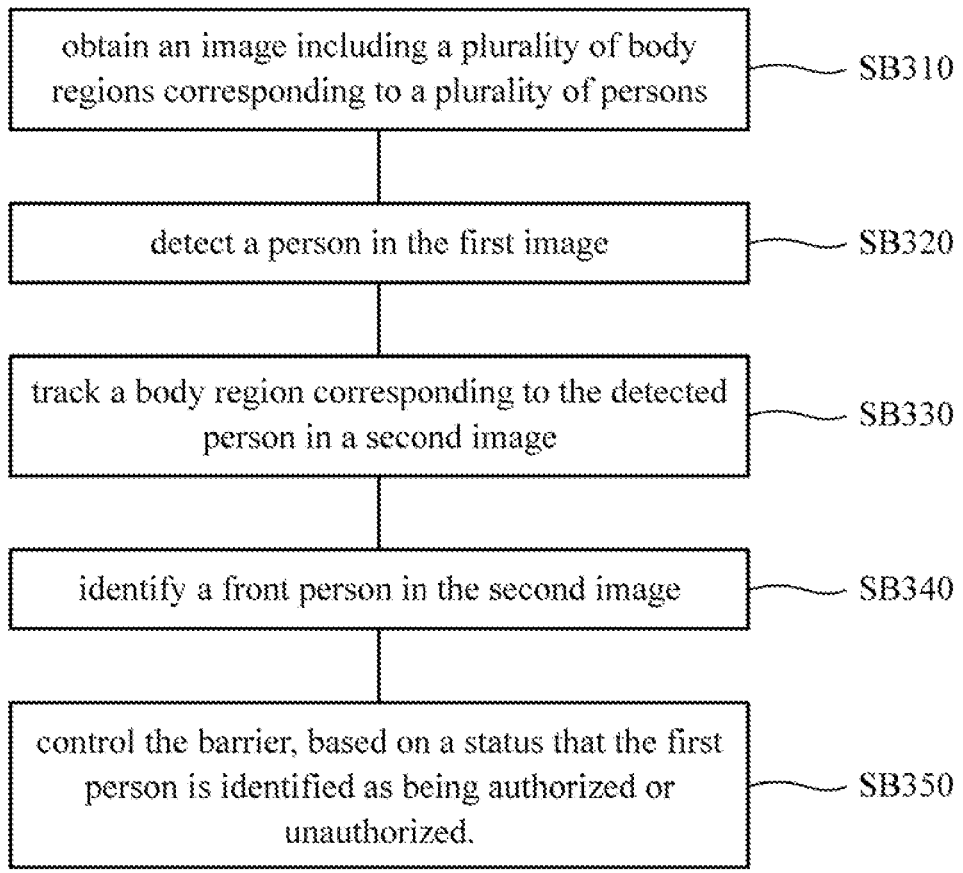
FIG. 3B is a flowchart illustrating an outline of a process performed by the information processing apparatus according to the embodiment.

FIG. 3B is a flowchart illustrating an overview of the process performed by the information processing apparatus 5 according to another example embodiment. With reference to FIGS. 1A, 1B and 2, the overview of the process performed by the information processing apparatus 5 will be described along the flowchart of FIG. 3B.

In SB310 of FIG. 3B, the information processing apparatus 5 may obtain a first image from a camera 4 at a first time. According to an embodiment, the method of obtaining the first image may include the following operations performed by the image acquisition unit 121. For instance, the image acquisition unit 121 may obtain the first image from the camera 4. The obtained first image may include a plurality of body regions, each of the body regions corresponding to a subject, among a plurality of subjects approaching the gate apparatus to be recognized. According to an embodiment, the subject to be recognized may be a person.

According to an example embodiment, the information processing apparatus 5 may detect a person by using face recognition before the person enters the gate 2. According to an example embodiment, the information processing apparatus 5 may detect a person by using face recognition before the person enters a gate area.

In SB320 of FIG. 3B, the information processing apparatus 5 may detect a person in the first image. According to an example embodiment, the information processing apparatus 5 may detect the person by performing facial recognition on the first image.

The method of performing facial recognition may include the following operations performed by the detection unit 122 and the extraction unit 123. For instance, the extraction unit 123 extracts a facial feature from the first image obtained by the image acquisition unit 121, and the detection unit 122 obtains the facial feature extracted by the extraction unit 123 and detects whether the facial feature matches a registered facial feature, among a plurality of registered facial features. Each of the plurality of registered facial features may correspond to a face of a person, among a plurality of persons previously registered. The registered facial features may be stored in a storage unit 129. Accordingly, the information processing apparatus 5 may detect and/or identify a person in the first image.

According to an example embodiment, the information processing apparatus 5 may detect and/or identify a plurality of persons in the first image. According to an example embodiment, the information processing apparatus 5 may simultaneously detect and/or identify a plurality of persons in the first image. According to an example embodiment, the information processing apparatus 5 may sequentially detect and/or identify a plurality of persons in the first image.

In SB330, the information processing apparatus 5 may track a body region in a second image captured at a second time. According to an embodiment, the information processing apparatus 5 may track the body region in the second image by associating a face region in the first image with a body region the first image, and matching the body region in the second image with the body region in the first image. According to an example embodiment, the information processing apparatus 5 may simultaneously track the plurality of persons in the first image.

According to an embodiment, the method of performing body tracking may include the following operations performed by the image acquisition unit 121, the detection unit 122, the extraction unit 123 and the association unit 125. For instance, the extraction unit 123 may extract a body region of a subject in the first image. The operation of extracting the body region may be performed after the detection unit detects a match between the face feature in the first image with a registered face feature. According to another embodiment, the operation of extracting the body region may be performed before the detection unit detects a match between the face feature in the first image with a registered face feature or simultaneously while the detection unit detects a match between the face feature in the first image with a registered face feature.

According to an embodiment, the association unit 125 associates the extracted body region with the face region in the first image. For instance, the association unit 125 determines that the body region corresponds to the face region by analyzing one or more characteristics of the face region and the body region. For instance, when the association unit 125 determines that one or more characteristics of the face region is similar to one or more characteristics of the body region, the association unit 125 may associate the face region with the body region. According to another embodiment, the association unit 125 may determine that the body region corresponds to the face region based on a proximity of the face region to the body region.

According to an embodiment, the association unit 125 may store the associated face region and body region in a storage unit 129. For instance, the storage unit 129 may store the face region and the body region in association with identification information of the detected person. The associated face region and body region may be temporarily stored in the storage unit 129.

According to an embodiment, the image acquisition unit 121 may obtain a second image captured by the camera 4 at a second time. The second time being different from the first time. According to an embodiment, the second time is after the first time. According to an embodiment, the second image may be captured by an image acquisition device, such as a camera, that is different from the camera capturing the first image.

According to an embodiment, the extraction unit 123 may extract a feature of the body region in the second image, and the detection unit 122 may obtain the feature of the body region in the second image from the extraction unit 123 and detect whether the feature of the body region in the second image matches a feature of body region stored in the storage unit 129. Accordingly, when there is a match between the body region in the second image and the body region obtained from the storage unit 129, the detection unit 122 may obtain the identification of the subject previously detected in the first image. Accordingly, the information processing apparatus 5 may track the subject using the body regions extracted in the first image and the second image.

According to another embodiment, the information processing apparatus 5 may perform the body tracking operation when a face feature in the second image is unable to be detected. For instance, the extraction unit 123 may extract a face feature in the second image and the detection unit 122 may obtain the face feature in the second image from the extraction unit 123 and determine that the face feature does not have sufficient information to perform face recognition. For instance, if the person approaching the camera is not facing the camera, the detection unit 122 may determine that sufficient face feature could not be extracted from the face of the person. According to an embodiment, the detection unit 122 may determine that there is insufficient information for face detection if the face of the person is turned more than 45 degrees away from the camera.

In SB340 of FIG. 3B, the information processing apparatus 5 may identify a front person in the second image. The front person may be a person, among a plurality of persons, who is closest to the second image capturing device or the gate apparatus. According to an example embodiment, this process may correspond to the illustration in FIG. 5, and the method of identifying the front person may include the operations similar to the operations performed in SA320 in FIG. 3A.

In SB350, the information processing apparatus 5 may control the barrier, based on a status that the front person is identified as being authorized or unauthorized. According to an embodiment, the authorization status of the person is determined based on tracked movement of the body region associated with the front person. According to an embodiment, the method of controlling the gate may be performed by a controller 126. For instance, the controller 126 may obtain information from the detection unit 122 indicating whether or not there is a match between the feature of the body region of the front person in the second image and the feature of the body region obtained from the storage unit 129. In a case where there is a match, the controller 126 may output a control signal to open the gate 2 as illustrated in FIG. 1A. On the other hand, in a case where there is no match, the controller 126 may maintain the gate 2 at a closed state as illustrated in FIG. 1B.

Figure 5:
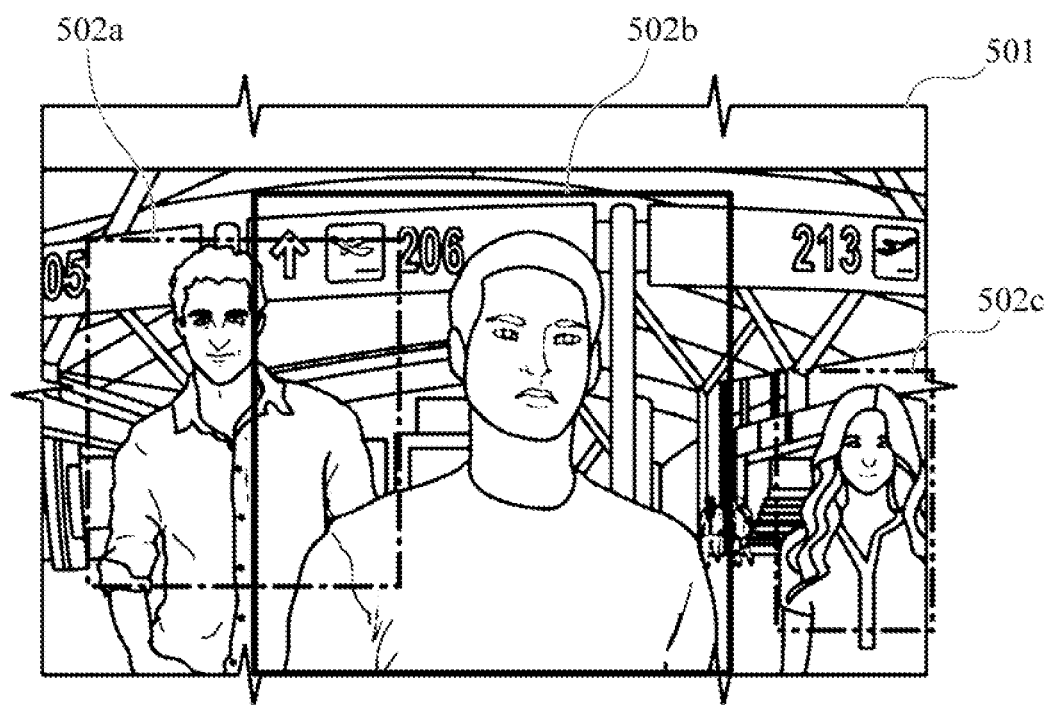
FIG. 5 illustrates an example of a process performed by the information processing apparatus according to an embodiment of FIGS. 3A and 3B.

FIG. 5 illustrates an example of a process performed by the information processing apparatus 5 for identifying the front person according to the embodiment illustrated in FIGS. 3A and 3B.

In FIG. 5, the information processing apparatus 5 may obtain an image 501 and extract a plurality of body regions (502a, 502b and 502c), each corresponding to one of the plurality of persons in the image 501. The information processing apparatus 5 may identify the front person by comparing a size of a feature corresponding to each of the plurality of body regions (502a, 502b and 502c). For instance, as illustrated in FIG. 5, the information processing apparatus 5 may compare an area covered by each of the plurality of body regions and determine the body region 502b, among the plurality of body regions (502a, 502b and 502c), having the largest area as the facial feature closest to the camera.

Although the body region illustrated in FIG. 5 includes a face region and an upper body region, the disclosure is not limited thereto. As such, according to other embodiments, the body regions illustrated in FIG. 4 or other regions may be considered for comparing a size of the feature to determine the front person.

Although FIG. 5 shows a rectangular boundary box to illustrate the body region, other shapes may be used as a boundary box to depict the body region for comparing the size. According to an embodiment, the boundary box may be displayed on a display. According to another embodiment, the boundary box may not displayed on the display, instead the boundary box may be generated to perform the size comparison operation.

Figure 6:
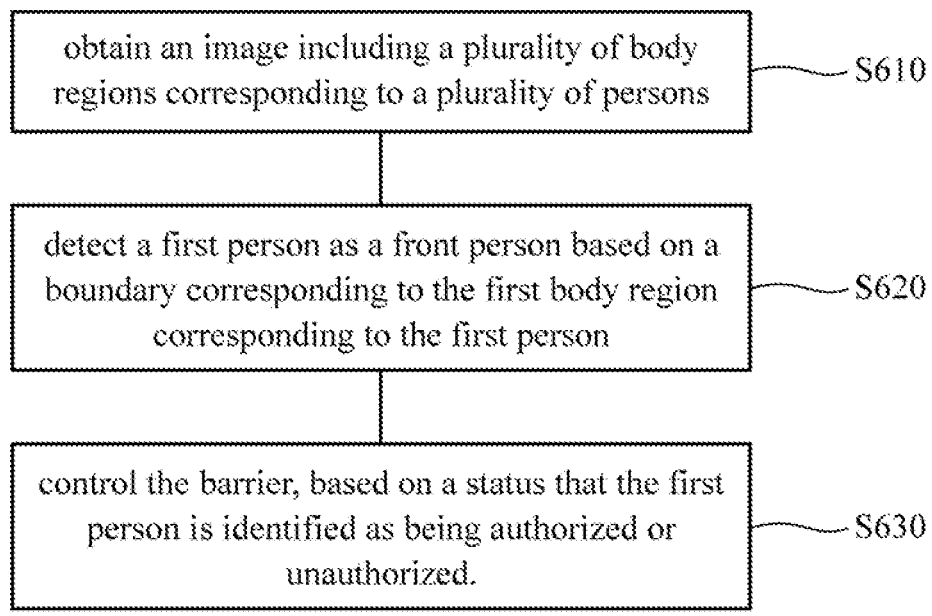
FIG. 6 is a flowchart illustrating a process performed by the information processing apparatus according to another embodiment.

FIG. 6 is a flowchart illustrating an overview of the process performed by the information processing apparatus 5 according to another embodiment. With reference to FIGS. 1A, 1B and 2, the overview of the process performed by the information processing apparatus 5 will be described along the flowchart of FIG. 6.

In S610 of FIG. 6, the information processing apparatus 5 may obtain an image from a camera 4 (as shown in FIGS. 1A and 1B). According to an embodiment, the method of obtaining the image may include the following operations performed by the image acquisition unit 121. For instance, the image acquisition unit 121 may obtain the image from the camera 4. The obtained first image may include a plurality of body regions, each of the body regions corresponding to a subject, among a plurality of subjects approaching the gate apparatus to be recognized. According to an embodiment, the subject to be recognized may be a person.

In S620 of FIG. 6, the information processing apparatus 5 may identify a front person in the image. The front person may be a person, among a plurality of persons, who is closest to the image capturing device or the gate apparatus. This process may correspond to the illustration in FIG. 7.

According to an embodiment, the method of identifying the front person may include the following operations performed by the detection unit 122 and the extraction unit 123. For instance, the extraction unit 123 may extract a plurality of body regions, each corresponding to one of the plurality of person in the image obtained by the image acquisition unit 121. According to an embodiment, the detection unit 122 may obtain the plurality of body regions extracted by the extraction unit 123, generate a boundary or an outline corresponding to each of the plurality of body regions, and identify a first person as the front person if the boundary is unobstructed. For instance, the detection unit 122 may analyze each of the boundaries corresponding to the respective person and determine a first boundary of a first person that is unobstructed by at least one second boundary corresponding to at least one second person as the boundary closest to the camera. As such, the first person associated with the first boundary closest to the camera or the gate apparatus is identified as a front person.

According to an embodiment, the first boundary may be unobstructed if one or more second boundaries do not overlap the first boundary. That is, the first boundary would be considered as being obstructed if one or more second boundaries partially or fully overlaps the first boundary. According to an embodiment, the first boundary may be unobstructed if the respective body regions within the one or more second boundaries do not overlap the first boundary. According to an embodiment, the first boundary may be unobstructed if one or more of second boundaries do not overlap the body region within the first boundary.

According to an embodiment, the boundary may be a bounding box surrounding the body region of the person. According to an embodiment, the shape of the bounding box may be rectangular, however, the shape is not limited to rectangle. As such, other shapes may be a boundary. According to an embodiment, the unobstructed bounding box has contiguous bounding border surrounding the entire body region.

Referring to FIG. 4, according to an embodiment, the body region surrounded by the boundary may be the entire (whole) body of the subject. According to other embodiments, the body region may be of one of a combination of the upper body portion and the head portion of the subject, a combination the head portion and the torso portion of the subject, a combination the torso portion and the arm portion of the subject or only the torso portion of the subject.

In S630, the information processing apparatus 5 may control the barrier, based on a status that the first person is identified as being authorized or unauthorized. According to an embodiment, the authorization status of the person is determined after to the detection of the first person as the front person. In this case, the image processing apparatus 5 may perform facial recognition on the front person by comparing information of a face feature of the front person with a plurality of registered information. According to an embodiment, the method of performing facial recognition may include the following operations performed by the detection unit 122. For instance, the detection unit 122 may obtain the facial feature of the front person extracted by the extraction unit 123 and detect whether the facial feature matches a registered facial feature, among a plurality of registered facial features. Each of the plurality of registered facial features may correspond to a face of a person, among a plurality of persons previously registered. The registered facial features may be stored in a storage device 106.

Accordingly, the information processing apparatus 5 may output information to control a barrier of the gate apparatus based on a result of the facial recognition performed after the detection of the front person. This process may correspond to the illustration in FIGS. 1A and 1B.

According to another embodiment, the authorization status of the person is determined prior to the detection of the first person as the front person. In this case, one or more of the plurality of persons may be authenticated prior to the determination of the front person and are tracked by the information processing apparatus 5 as discussed in detail above with respect to FIG. 3.

Figure 7:
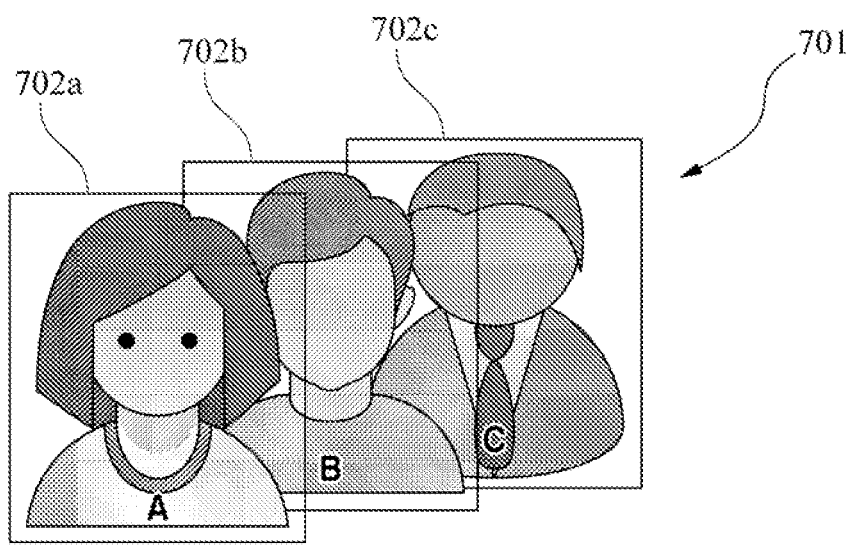
FIG. 7 illustrates an example of a process performed by the information processing apparatus according to an embodiment of FIG. 6.

FIG. 7 illustrates an example of the process performed by the information processing apparatus according to the embodiment of FIG. 6.

In FIG. 7, the information processing apparatus 5 may obtain an image 701 and may extract a plurality of body regions (702*a*, 702*b* and 702*c*), each corresponding to one of the plurality of persons in the image 701. The information processing apparatus 5 may identify the front person by generating a bounding box surrounding each of the plurality of body regions corresponding to each of the plurality of persons. According to an embodiment, a body tracker may use the bounding box corresponding to each of the body regions to determine the closest body region to the gate apparatus or the camera.

For instance, as illustrated in FIG. 7, the information processing apparatus 5 may determine the boundary surrounding the body region 702*a* is unobstructed (i.e., not overlapped) by any of the other boundaries corresponding to body regions 702*b* and 702*c*, as the facial feature closest to the camera.

Although FIG. 7 shows a rectangular boundary box to illustrate the body region, other shapes may be used as a boundary box to depict the body region for comparing the size. According to embodiment, the boundary box may be displayed on a display. Also, the boundary box may be a tracker that moves along with the movement of the person associated with the boundary box. According to another embodiment, the boundary box may not displayed on the display but may be generate to perform the size comparison.

FIG. 8 is a block diagram illustrating an example of a hardware configuration of a gate control apparatus 1 according to an example embodiment.

In FIG. 8, the gate apparatus 1 has a CPU 102, a RAM 104, a storage device 106, an input device 108, a display 110, a camera 112, a gate 114, and a communication unit 116. The CPU 102, the RAM 104, the storage device 106, the input device 108, the display 110, the camera 112, the gate 114, and the communication unit 116 are connected to a bus line 118.

The CPU 102 may function as a control unit that operates by executing a program stored in the storage device 106 and controls the operation of the entire gate apparatus 1. Further, the CPU 102 may execute an application program stored in the storage device 106 to perform various processes as the gate apparatus 1. The RAM 104 may provide a memory field necessary for the operation of the CPU 102.

The storage device 106 may be formed of a storage medium such as a non-volatile memory, a hard disk drive, or the like and functions as a storage unit. The storage device 106 may store a program executed by the CPU 102, data referenced by the CPU 102 when the program is executed, or the like.

The input device 108 may be a touchscreen embedded in the display 110, for example. The input device 108 may function as an input unit that accepts input from a user.

The display 110 may function as a display unit that displays various windows to a user using the gate apparatus 1. For example, the display 110 may display a guidance window showing how to use the gate apparatus 1, a notification window to the user, or the like.

The camera 112 may capture an image of a person or a plurality of persons. The image may include a face region and a body region of the person or persons. For example, the camera 112 may be a digital camera that captures a front area of the gate apparatus 1, and when detecting a face of the user standing in front of the gate apparatus 1 in an image captured continuously or periodically, captures the face of the user 1 and acquires the face image thereof.

According to an embodiment, when identity verification of the person is successful in the gate apparatus 1, the gate 114 changes from a closed state for a standby mode to block passage of the person to an opened state to permit the person to pass through the passage. The scheme of the gate 114 is not particularly limited and may be, for example, a flapper gate in which one or more flappers provided on one side or both side of the passage are opened or closed, a turn-style gate in which three bars are revolved, or the like.

The communication unit 116 may be connected to a network and may transmit and receive data via the network. The communication unit 116 communicate with a server or the like under the control of the CPU 102.

The disclosure is not limited to the example embodiments described above but can be changed as appropriate within a range not departing from the spirit of the disclosure.

While the information processing apparatus and systems used in facial recognition for gate control have been illustrated as examples in each of the above example embodiments, the disclosure is also applicable to areas of facial recognition and body tracking other than gate control by appropriately changing the configuration of the one or more example embodiments.

The scope of one or more example embodiments also includes a processing method of storing, in a storage medium, a program that causes the configuration of the example embodiment to operate to implement the function of the example embodiment described above, reading out as a code the program stored in the storage medium, and executing the code in a computer. That is, a computer readable storage medium is also included in the scope of each example embodiment. Further, not only the storage medium in which the program described above is stored but also the program itself is included in each example embodiment. Further, one or more components included in the example embodiments described above may be a circuit such as an Application Specific Integrated Circuit (ASIC), a Field Programmable Gate Array (FPGA), or the like configured to implement the function of each component.

As the storage medium, for example, a floppy (registered trademark) disk, a hard disk, an optical disk, a magneto-optical disk, a Compact Disk (CD)-ROM, a magnetic tape, a nonvolatile memory card, or a ROM can be used. Further, the scope of each of the example embodiments includes an example that operates on Operating System (OS) to perform a process in cooperation with another software or a function of an add-in board without being limited to an example that performs a process by an individual program stored in the storage medium.

The service implemented by the function of one or more example embodiments described above can be provided to the user in a form of Software as a Service (SaaS).

Note that all the example embodiments described above are mere examples of embodiments in implementing the disclosure, and the technical scope of the disclosure should not be construed in a limiting sense by these example embodiments. That is, the disclosure can be implemented in various forms without departing from the technical concept thereof or the primary feature thereof.

A part or all of the exemplary embodiment described above can be written as in the supplementary notes below, but is not limited thereto.

Supplementary Note 1

An apparatus comprising:
a memory storing one or more instructions; and
a processor configured to execute the one or more instructions to:
  obtain a first image including a plurality of body regions captured at a first time by one or more cameras, each of the plurality of body regions corresponding to a person, among a plurality of persons;
  detect a first person, among the plurality of persons, by performing facial recognition operation on one of the plurality of body regions in the image obtained from the camera;
  determine, based on a size of a first body region corresponding to the first person captured in a second image, that the first body region approaching the barrier corresponds to a person closest to the barrier among the plurality of persons; and
  output information to control the barrier to open based on the determination that the first body region corresponds to the person closest to the barrier among the plurality of persons.

Supplementary Note 2

The apparatus of supplementary note 1, wherein each of the plurality of body regions comprises a face region and a torso region.

Supplementary Note 3

The apparatus of supplementary note 1, wherein the first body region in the second image comprises a torso region.

Supplementary Note 4

The apparatus of supplementary note 1, wherein the processor is further configured to track the first body region in the second image captured by the one or more cameras at a second time subsequent to the first time.

Supplementary Note 5

The apparatus of supplementary note 1, wherein the processor is further configured to determine that the first body region approaching the barrier corresponds to the person closest to the barrier by:
  comparing the size of the first body region with sizes of each of the other body regions, among the plurality of body regions; and
  determining the first body region having the largest size as the closest body region to the barrier.

Supplementary Note 6

The apparatus of supplementary note 1,
wherein the facial recognition operation comprises comparing information on a feature region corresponding to the first body region of the first person with a plurality of registered information, each of the plurality of registered identification information corresponding to a person registered prior to obtaining the image.

Supplementary Note 7

The apparatus of supplementary note 6, wherein the body region comprises a face region and a torso region, and wherein the feature region is the face region.

Supplementary Note 8

The apparatus of supplementary note 6, wherein the processor is further configured to determine that the first body region approaching the barrier corresponds to the person closest to barrier by:
  comparing the size of the first body region with sizes of each of the other body regions, among the plurality of body regions; and
  determining the first body region having the largest size as the closest body region to the barrier.

Supplementary Note 9

The apparatus of supplementary note 6, wherein the processor is further configured to detect the person closest to the camera based on the body size before the facial recognition operation.

Supplementary Note 10

The apparatus of supplementary note 1, wherein the processor is further configured to:
  generate a first boundary corresponding a first body region of the first person; and
  determine, based on the first boundary being unobstructed by a second boundary corresponding a second body region, that the first body region approaching the barrier corresponds to the person closest to the barrier among the plurality of persons.

Supplementary Note 11

The apparatus of supplementary note 10, wherein each of the plurality of body regions comprises a face region and a torso region.

Supplementary Note 12

The apparatus of supplementary note 10, wherein the first boundary is a contiguous bounding box surrounding the first body region.

Supplementary Note 13

The apparatus of supplementary note 10, wherein the first boundary is unobstructed when one or more second boundaries corresponding to one or more second persons do not overlap the first boundary.

Supplementary Note 14

The apparatus of supplementary note 13, wherein the first boundary is unobstructed when the respective second body regions within the one or more second boundaries do not overlap the first boundary.

Supplementary Note 15

The apparatus of supplementary note 13, wherein the first boundary is unobstructed when the respective the one or more second boundaries do not overlap the first body region within the first boundary.

Supplementary Note 16

The apparatus of supplementary note 1, wherein the processor is further configured to:
  obtain the first image including a first body region corresponding to a first person and a second body region corresponding to a second person;
  generate a first boundary corresponding the first body region of the first person;
  generate a second boundary corresponding the second body region;
  identify that a first person is closest to the camera based on a determination that the first boundary corresponding the first body region is unobstructed by the second boundary corresponding the second body region; and
  output information to control the barrier based on a result of the facial recognition operation, the facial recognition operation comprising comparing information on the first body region of the first person with a plurality of registered information, each of the plurality of registered identification information corresponding to a person registered prior to obtaining the image.

Supplementary Note 17

The apparatus of supplementary note 16, wherein the processor is further configured to detect the person closest to the camera based on the boundary before the facial recognition operation.

Supplementary Note 18

A method comprising:
  obtaining a first image including a plurality of body regions captured at a first time by one or more cameras, each of the plurality of body regions corresponding to a person, among a plurality of persons;
  detecting a first person, among the plurality of persons, by performing facial recognition operation on one of the plurality of body regions in the image obtained from the camera;
  determining, based on a size of a first body region corresponding to the first person captured in a second image, that the first body region approaching the barrier corresponds to a person closest to the barrier among the plurality of persons; and
  outputting information to control the barrier to open based on the determination that the first body region corresponds to the person closest to the barrier among the plurality of persons.

Supplementary note 19

A non-transitory computer readable medium having stored thereon a program for performing a method comprising:

obtaining a first image including a plurality of body regions captured at a first time by one or more cameras, each of the plurality of body regions corresponding to a person, among a plurality of persons;

detecting a first person, among the plurality of persons, by performing facial recognition operation on one of the plurality of body regions in the image obtained from the camera;

determining, based on a size of a first body region corresponding to the first person captured in a second image, that the first body region approaching the barrier corresponds to a person closest to the barrier among the plurality of persons; and outputting information to control the barrier to open based on the determination that the first body region corresponds to the person closest to the barrier among the plurality of persons.

This application is based upon and claims the benefit of priority from U.S. provisional patent application No. 63/065,868, filed Aug. 14, 2020, the disclosure of which is incorporated herein in its entirety.

The invention claimed is:

1. An apparatus comprising:
a memory storing one or more instructions; and
a processor configured to execute the one or more instructions to:
obtain a first image including a plurality of body regions captured at a first time by one or more cameras, each of the plurality of body regions corresponding to a person, among a plurality of persons;
detect a first person, among the plurality of persons, by performing facial recognition operation on one of the plurality of body regions in the image obtained from the camera;
generate a first boundary corresponding to a first body region of the first person among the plurality of body regions;
determine, based on the first boundary being unobstructed by a second boundary corresponding to a second body region among the plurality of body regions, that the first body region approaching a barrier corresponds to a person closest to the barrier among the plurality of persons; and
output information to control the barrier to open based on the determination that the first body region corresponds to the person closest to the barrier among the plurality of persons.

2. The apparatus of claim 1, wherein each of the plurality of body regions comprises a face region and a torso region.

3. The apparatus of claim 1,
wherein the facial recognition operation comprises comparing information on a feature region corresponding to the first body region of the first person with a plurality of registered information, each of the plurality of registered identification information corresponding to a person registered prior to obtaining the image.

4. The apparatus of claim 3, wherein the first body region comprises a face region and a torso region, and wherein the feature region is the face region.

5. The apparatus of claim 1, wherein each of the plurality of body regions comprises a face region and a torso region.

6. The apparatus of claim 1, wherein the first boundary is a contiguous bounding box surrounding the first body region.

7. The apparatus of claim 1, wherein the first boundary is unobstructed when one or more second boundaries corresponding to one or more second persons do not overlap the first boundary.

8. The apparatus of claim 7, wherein the first boundary is unobstructed when respective second body regions within the one or more second boundaries do not overlap the first boundary.

9. The apparatus of claim 7, wherein the first boundary is unobstructed when the respective one or more second boundaries do not overlap the first body region within the first boundary.

10. The apparatus of claim 1
wherein the first image includes the first body region corresponding to the first person and the second body region corresponding to a second person,
wherein the processor is further configured to:
generate the second boundary corresponding the second body region,
determine that the first person is closest to the camera based on a determination that the first boundary corresponding the first body region is unobstructed by the second boundary corresponding the second body region, and
output the information to control the barrier to open further based on a result of the facial recognition operation, the facial recognition operation comprising comparing information on the first body region of the first person with a plurality of registered information, each of the plurality of registered identification information corresponding to a person registered prior to obtaining the image.

11. The apparatus of claim 10, wherein the processor is further configured to detect the person closest to the camera based on the boundary before the facial recognition operation.

12. The apparatus of claim 1, wherein the processor is further configured to determine whether the first boundary is obstructed by the second boundary corresponding the second body region.

13. A method comprising:
obtaining a first image including a plurality of body regions captured at a first time by one or more cameras, each of the plurality of body regions corresponding to a person, among a plurality of persons;
detecting a first person, among the plurality of persons, by performing facial recognition operation on one of the plurality of body regions in the image obtained from the camera;
generating a first boundary corresponding to a first body region of the first person among the plurality of body regions;
determining, based on the first boundary being unobstructed by a second boundary corresponding to a second body region among the plurality of body regions, that the first body region approaching a barrier corresponds to a person closest to the barrier among the plurality of persons; and
outputting information to control the barrier to open based on the determination that the first body region corresponds to the person closest to the barrier among the plurality of persons.

14. A non-transitory computer readable medium having stored thereon a program for performing a method comprising:
obtaining a first image including a plurality of body regions captured at a first time by one or more cameras, each of the plurality of body regions corresponding to a person, among a plurality of persons;

detecting a first person, among the plurality of persons, by performing facial recognition operation on one of the plurality of body regions in the image obtained from the camera;

generating a first boundary corresponding to a first body region of the first person among the plurality of body regions;

determining, based on the first boundary being unobstructed by a second boundary corresponding to a second body region among the plurality of body regions, that the first body region approaching a barrier corresponds to a person closest to the barrier among the plurality of persons; and outputting information to control the barrier to open based on the determination that the first body region corresponds to the person closest to the barrier among the plurality of persons.

* * * * *